United States Patent
Iwai

(10) Patent No.: US 7,360,227 B2
(45) Date of Patent: Apr. 15, 2008

(54) CHUCKING APPARATUS AND RECORDING DISK DRIVE MOTOR HAVING CHUCKING APPARATUS

(75) Inventor: Yusuke Iwai, Kyoto (JP)

(73) Assignee: Nidec Corporation, Kyoto (JP)

(*) Notice: Subject to any disclaimer, the term of this patent is extended or adjusted under 35 U.S.C. 154(b) by 303 days.

(21) Appl. No.: 11/163,506

(22) Filed: Oct. 20, 2005

(65) Prior Publication Data

US 2006/0085809 A1    Apr. 20, 2006

(30) Foreign Application Priority Data

Oct. 20, 2004  (JP) ............... 2004-305042
Oct. 18, 2005  (JP) ............... 2005-303750

(51) Int. Cl.
*G11B 17/028* (2006.01)

(52) U.S. Cl. .................................... 720/707

(58) Field of Classification Search ............... 720/707, 720/715; 360/98.08, 99.05, 99.12; 310/67 R
See application file for complete search history.

(56) References Cited

U.S. PATENT DOCUMENTS

| 6,252,319 | B1* | 6/2001 | Sudo et al. ............. 310/67 R |
| 6,363,048 | B1* | 3/2002 | Wu et al. ................. 720/707 |
| 6,611,490 | B1* | 8/2003 | Bierhoff .................. 720/707 |
| 6,868,549 | B2* | 3/2005 | Watanabe et al. ....... 720/715 |
| 2004/0216154 | A1* | 10/2004 | Kim et al. ............. 720/707 |

FOREIGN PATENT DOCUMENTS

| JP | 2003-006967 A | 1/2003 |
| JP | 2003-059144 A | 2/2003 |
| JP | 2004-071101 A | 3/2004 |
| JP | 2004-185695 A | 7/2004 |
| JP | 2004-199830 A | 7/2004 |
| JP | 2004-213812 A | 7/2004 |
| JP | 2004-327001 A | 11/2004 |

\* cited by examiner

*Primary Examiner*—Tianje Chen
(74) *Attorney, Agent, or Firm*—Westerman, Hattori, Daniels & Adrian, LLP.

(57) ABSTRACT

A second inclined surface (84c) which abuts against a recording disk of a chuck pawls (84) of a recording disk holding mechanism (80), and a third inclined surface (84d) which is a curved surface for guiding chucking motion of the chuck pawls (84) are provided. A boundary between the second inclined surface (84c) and the third inclined surface (84d) is formed with a stepped recess approaching a base.

13 Claims, 10 Drawing Sheets

CHUCKING APPARATUS AND RECORDING DISK DRIVE MOTOR HAVING CHUCKING APPARATUS

BACKGROUND OF THE INVENTION

1. Field of the Invention

The present invention relates to a chucking apparatus for holding a recording disk, and to a recording disk drive motor having the chucking apparatus.

2. Background Art

FIG. 10 shows a recording disk drive motor using a conventional chucking apparatus. A rotation member 1 of the motor includes a shaft 3 rotatably supported by a sleeve 2 which is a bearing member, a rotor holder 4 fixed to an upper portion of the shaft 3 in an axial direction of the rotation member 1, and a chucking apparatus 5 fixed to the shaft 3 at its portion higher than the rotor holder 4 in the axial direction. The chucking apparatus 5 includes a centering case 5a which is fitted into a recording disk 6, and a plurality of chuck pawls 5c which are arranged on the centering case 5a at equal distances from one another in a circumferential direction of the centering case 5a. The chuck pawls 5c are biased radially outward by resilient members 5b, respectively. The chucking apparatus 5 also includes a plurality of centering inclined portions 5d for centering the recording disk 6. A recording disk mounting surface 4b for mounting the recording disc 6 is formed on a radially outer end of a bottom surface 4a of the rotor holder 4. A rubber 4c is fixed to an upper side of the recording disk mounting surface 4b.

To mount the recording disk 6 on the motor, a central through hole of the recording disk 6 is aligned with the plurality of centering inclined portions 5d of the chucking apparatus 5 and in this state, the recording disk 6 is mounted on the centering case 5a. When the central through hole of the recording disk 6 starts fitting around the centering case 5a, the chuck pawls 5c are pushed by an inner peripheral surface of the central through hole of the recording disk 6 and moved radially inward of the recording disk 6. If the recording disk 6 is completely mounted and placed on the rubber 4c, tip ends 5c1 of the chuck pawls 5c are pushed by resilience of the resilient member 5b and the tip ends 5c1 push an upper peripheral edge of the inner peripheral surface of the central through hole of the recording disk 6. With this, the recording disk 6 is held by the rotation member 1. Therefore, when the rotation member 1 rotates, the recording disk 6 does not come out due to centrifugal force or its own weight or is not inclined.

The chuck pawl 5c has an inclined surface 5c2 which pushes the upper peripheral edge of the inner peripheral surface of the center hole of the recording disk 6. The inclined surface 5c2 is formed with one curved portion directed radially outward. It is preferable that a force required for mounting the recording disk is smaller. Thus, the tip end 5c1 of the chuck pawl 5c is set short. For this reason, it is necessary that a curvature of the inclined surface 5c2 of the chuck pawl 5c which pushes the recording disk 6 is small. Therefore, an angle formed between contact surfaces of the inclined surface 5c2 and the recording disk 6 is adversely increased. For this reason, a pushing force of the chuck pawl 5c against the recording disk 6 is greater on the outer side in the recording disk, and is smaller on the lower side in the axial direction. As a result, when the recording disk 6 is to be detached from a state where the recording disk 6 is held by the rotation member 1, a force required for detaching the recording disk 6 from the rotation member 1 (such a force is called detaching force, hereinafter) is adversely reduced. If the detaching force is reduced, when the rotor rotates, there is an adverse possibility that the recording disk 6 comes out from the rotation member 1 due to the centrifugal force or impact from outside.

If an elastic force of the resilient member 5b is increased to increase the detaching force, e.g., if the resilient member 5b is a coil spring and a spring constant is increased, the detaching force itself can be increased but it becomes difficult to move the chuck pawl 5c in radially inward, and a force required for mounting the recording disk 6 on the rotation member 1 (such a force is called mounting force, hereinafter) is increased. Thus, it becomes difficult to easily mount the recording disk 6 on the rotation member 1 and the operability is deteriorated.

If the elastic force of the resilient member 5b is increased, since the force acting radially outward is increased, a force required for pushing the inner peripheral surface of the central through hole of the recording disk 6 is increased. Thus, the central through hole of the recording disk 6 is deformed by the chuck pawl 5c, and there is a possibility that the central through hole of the recording disk 6 is deviated from the centering inclined portions 5d which center the recording disk 6. As a result, the centering precision of the recording disk 6 is deteriorated, and the recording disk 6 may rotate while deflecting radially.

BRIEF SUMMARY OF THE INVENTION

The present invention provides a chucking apparatus capable of enhancing only the detaching force without increasing a radially outward force of the resilient member, and capable of exhibiting excellent reliability and durability.

One example of the chucking apparatus of the present invention comprises a centering case which is disposed on the side of an inner periphery of a through hole of a recording disk and which aligns a rotational axis and a center of the chucking apparatus, chuck pawls for holding the recording disk, a resilient member for biasing the chuck pawls radially outward, and a recording disk mounting surface on which the recording disk is placed.

Each of the chuck pawls includes a base accommodated in a centering case, and a tip end projecting from an outer periphery of the centering case for holding the recording disk.

The tip end of the chuck pawl is formed with a first inclined surface defined as an upper side of the tip end, and connected by a lower side of a peripheral edge of the through hole of the recording disk when the recording disk is pushed down to be set on the chucking apparatus.

The tip end of the chuck pawl is further formed with a second inclined surface defined as an outer part on a lower side of the tip end, and connected by the upper side of the peripheral edge of the through hole of the recording after the recording disk was pushed down.

The tip end of the chuck pawl is further formed with a curved surface defined from an outer portion of the base to an inner portion of the second inclined surface.

A boundary defined between the second inclined surface and the curved surface is formed with a stepped recess.

In the connecting portion between the recording disk and the chuck pawls, an angle formed between the second inclined surface and the upper surface of the recording disk is smaller than an angle formed between the upper surface of the recording disk and a phantom curved surface connecting the curved surface and an outermost diameter portion of the tip end.

In the connecting portion between the recording disk and the chuck pawls, an angle formed between the second inclined surface and the upper surface of the recording disk is smaller than an angle formed between the upper surface of the recording disk and a surface connecting the outermost diameter portion of the curved surface and the outermost diameter portion of the tip end.

The boundary is formed with an auxiliary inclined surface.

The inclined surface may be curved.

A recording disk drive motor having the chucking apparatus comprises a drive magnet, a rotation member which fixes the chucking apparatus and rotates coaxially with the chucking apparatus, a bearing member which rotatably supports the rotation member, and a fixing member having an armature for fixing the bearing member.

DETAILED DESCRIPTION OF THE INVENTION

Figure 1:
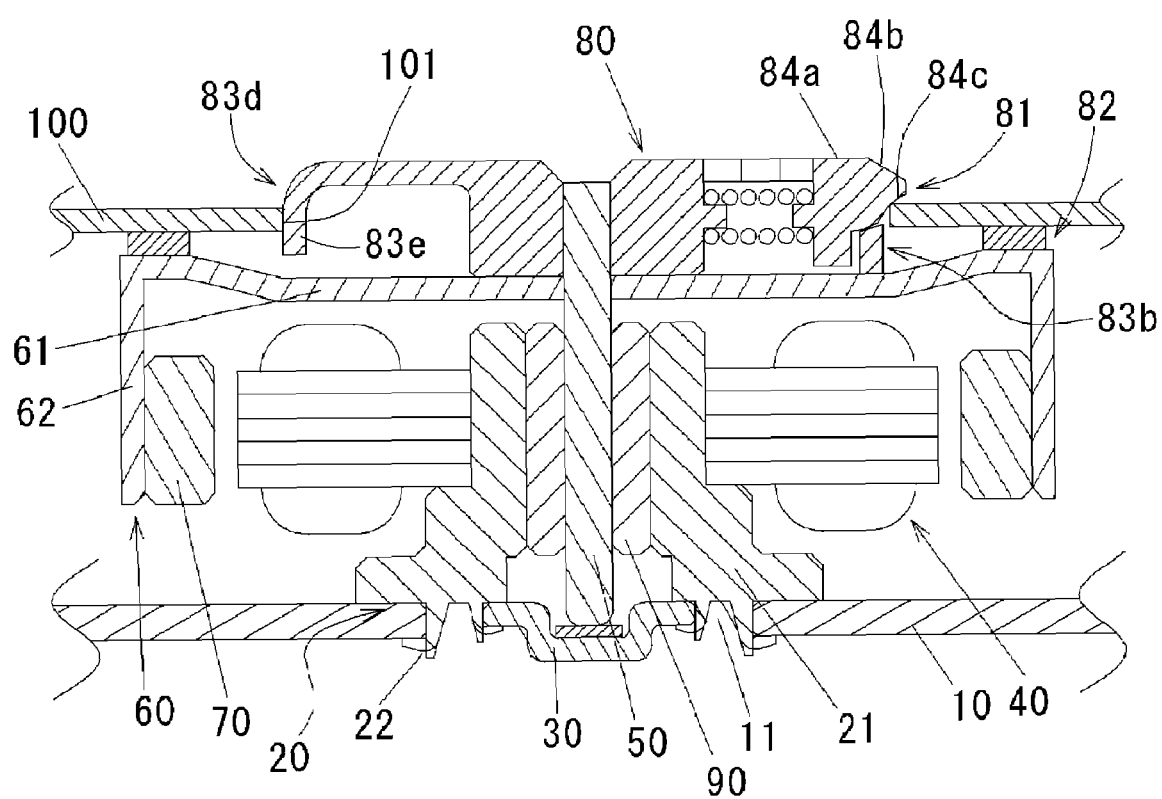
FIG. 1 is a schematic sectional view showing an embodiment of a recording disk drive motor of the present invention.

One embodiment of a recording disk drive motor using a turntable apparatus of the present invention will be explained with reference to FIG. 1. FIG. 1 is a sectional view taken along an axis 0-0 in FIG. 2.

Entire Structure of Motor

The motor includes a rotation member, a bearing member which rotatably supports the rotation member, and a fixing member for holding the bearing member.

The fixing member includes a mounting plate 10, a bush 20, a closing plate 30 and an armature 40.

The mounting plate 10 is formed with a circular hole 11, and a base 21 of a substantially cylindrical bush 20 is fixed in the circular hole 11. The base 21 of the bush 20 is fixed to the mounting plate 10 by plastically deforming a swage portion 22 which is a lower end of the bush 20 radially outward using a press for example. A closing plate 30 for closing a lower end of the bush 20 is mounted on a lower portion of the bush 20. The closing plate 30 is fixed to the bush 20 by plastically deforming another swage portion 22 formed on a lower end of the bush 20 radially inward using a press for example. An armature 40 is fixed to an outer peripheral surface of the bush 20. The armature 40 has laminated cores coated with insulative material, and a conductive wire is wound around the cores.

The rotation member includes a shaft 50, a rotor holder 60, a driving magnet 70, and a chucking apparatus 80.

A cylindrical rotor holder 60 having a bottom is fixed to an upper portion of the shaft 50 which is disposed coaxially with the rotation shaft. The rotor holder 60 is formed of magnetic material by a press. A chucking apparatus 80 is fixed to an upper side of a bottom surface 61 of the rotor holder 60. The chucking apparatus 80 holds a recording disk (not shown in FIG. 1) and rotates. Rotor magnets 70 are adhered to radially inner sides of the cylindrical portion 62 of the rotor holder 60. The rotor magnets 70 are opposed to the armature 40 at a distance from each other in the radial direction of the rotation.

To rotatably support the rotation shaft, a sleeve 90 which is a bearing member is fixed to an inner peripheral surface of the cylindrical portion of the bush 20. The bearing member is not limited to the sleeve 90, and may be a rolling-element bearing such as a ball bearing.

If the armature 40 is energized, a magnetic field is generated around the armature 40, and the rotation member is rotated by the interaction between the magnetic field and the driving magnet 70.

Structure of Chucking Apparatus

Figure 2:
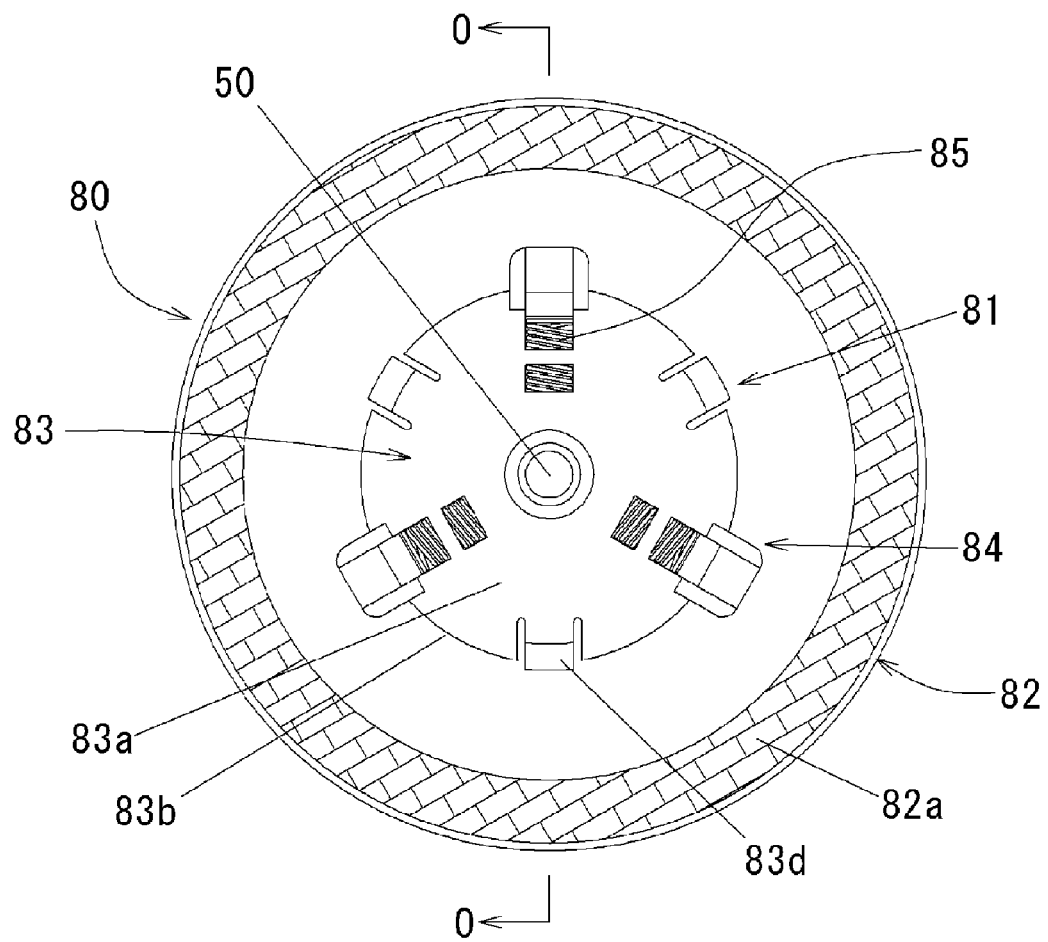
FIG. 2 is a plan view showing a chucking apparatus of the invention.

A structure of the chucking apparatus 80 will be explained with reference to FIG. 2. FIG. 2 is a plan view of the chucking apparatus 80 as viewed from above in the axial direction.

The chucking apparatus 80 includes a recording disk holder 81 mounted on an inner periphery of a central through hole 101 of a recording disk 100 (not shown in FIG. 2), and a recording disk mounting surface 82 which directly supports a peripheral surface of the central through hole 101 of the recording disk 100.

The recording disk holder 81 includes a centering case 83 inserted into an inner periphery of the central through hole 101 of the recording disk 100, chuck pawls 84 for holding the recording disk 100, and resilient members 85 for biasing the chuck pawls 84 radially outward.

The recording disk mounting surface 82 includes an annular cushioning 82a such as rubber disposed for preventing the recording disk 100 from vibrating and slipping.

Centering Case

The centering case 83 is of a cylindrical shape having a bottom. The centering case 83 has such a center hole that the shaft 50 can be fixed. The centering case 83 includes a bottom surface 83a, an outer cylindrical portion 83b and an inner cylindrical portion 83c (see a sectional view of the centering case 8 in the axial direction of the rotation shaft in FIG. 4). The centering case 83 is provided at its portion of its outer periphery with recording disk centering mechanisms 83d. The recording disk centering mechanisms 83d align the center of the recording disk 100 which is placed and a rotation center of the chucking apparatus 80.

The outer diameter of the centering case 83 is slightly smaller than the smallest diameter within a tolerance of an outer diameter of the central through hole 101 of the recording disk 100. With this design, if the central through hole 101 of the recording disk 100 has a size within the tolerance defined by the specification, the centering case 83 is fixed into the central through hole 101 of the recording disk 100.

Recording Disk Centering Mechanism

Figure 3:
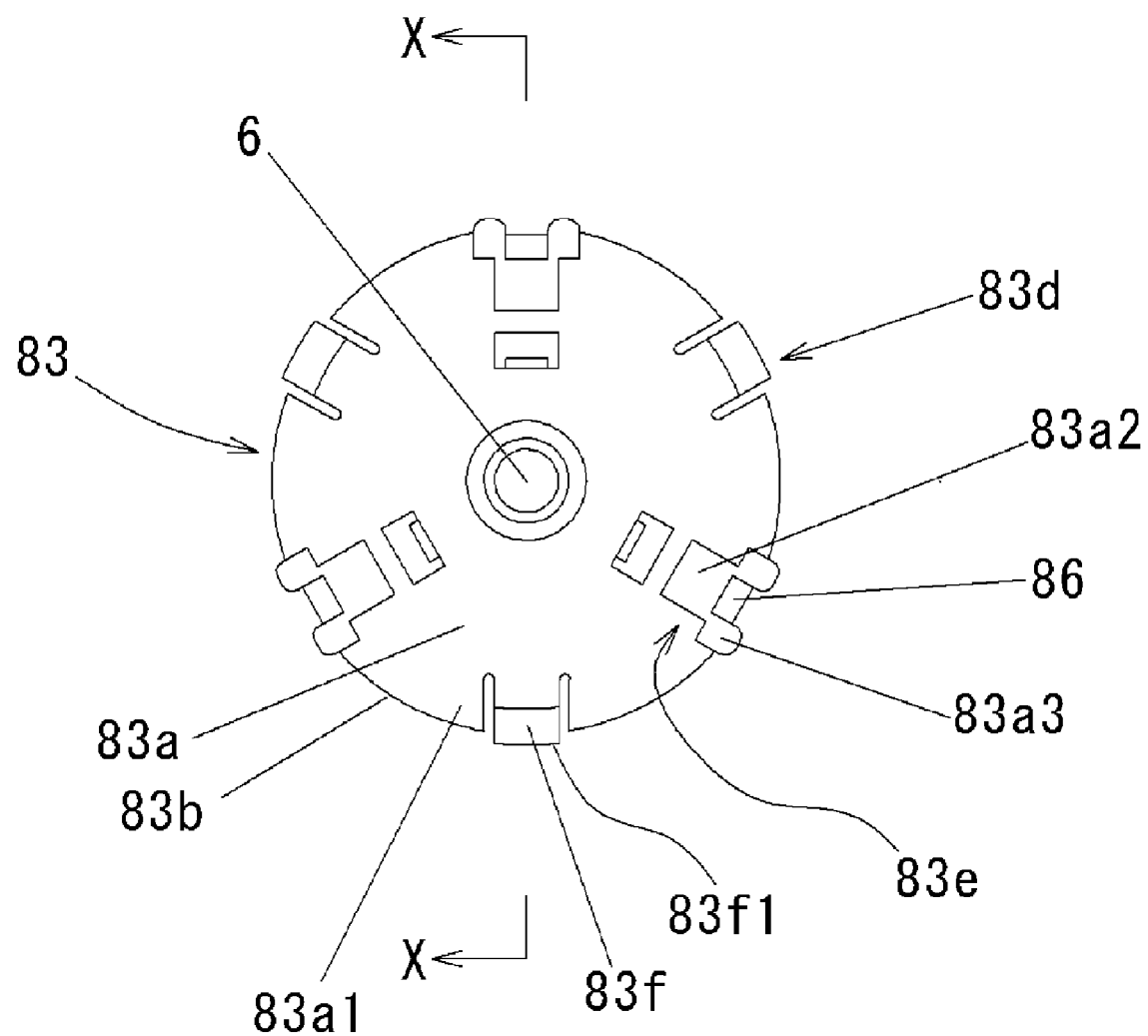
FIG. 3 is a plan view showing a centering case of the chucking apparatus of the invention.

The centering or aligning operation of the recording disk will be explained with reference to FIG. 3. FIG. 3 is a plan view of the centering case 83 as viewed from above in the axial direction.

The recording disk centering mechanisms 83d include three pairs of holes 83e formed from an end 83a1 of the bottom surface 83a of the centering case 83 to the cylindrical portion 83b at equal distances from one another in the circumferential direction. A centering pawl 83f is formed between each pair of holes 83e. An upper end of the centering pawl 83f is integrally formed with the end 83a1 of the centering case 83, and the upper end extends radially outward such that the upper end is inclined downward. The lowermost portion of the centering pawl 83f slightly projects radially outward of the outer diameter of the centering case 83.

Here, a relation of sizes of the recording disk 100 (not shown in FIG. 3) and the recording disk centering mechanism 83d will be explained. The outer diameter of the centering case 83 is set to a value equal to or smaller than the smallest tolerance within the tolerance range of the central through hole 101 of the recording disk 100 as described above. A radius of a phantom circle formed by the lowermost portion 83f1 of each of the centering pawls 83f is set slightly greater than the maximum tolerance within the tolerance range of the central through hole 101 of the recording disk 100. With this design, if the recording disk 100 is mounted on the chucking apparatus 80, the inner peripheral surface of the central through hole 101 of the recording disk 100 and the lowermost portion 83f1 abut against each other, and the center of the recording disk 100 and the center of the chucking apparatus 80 are aligned with each other. To center the recording disk 100, it is preferable that at least three centering pawls 83f are provided in the circumferential direction at equal distances from each other.

Recording Disk Holder

Figure 4:
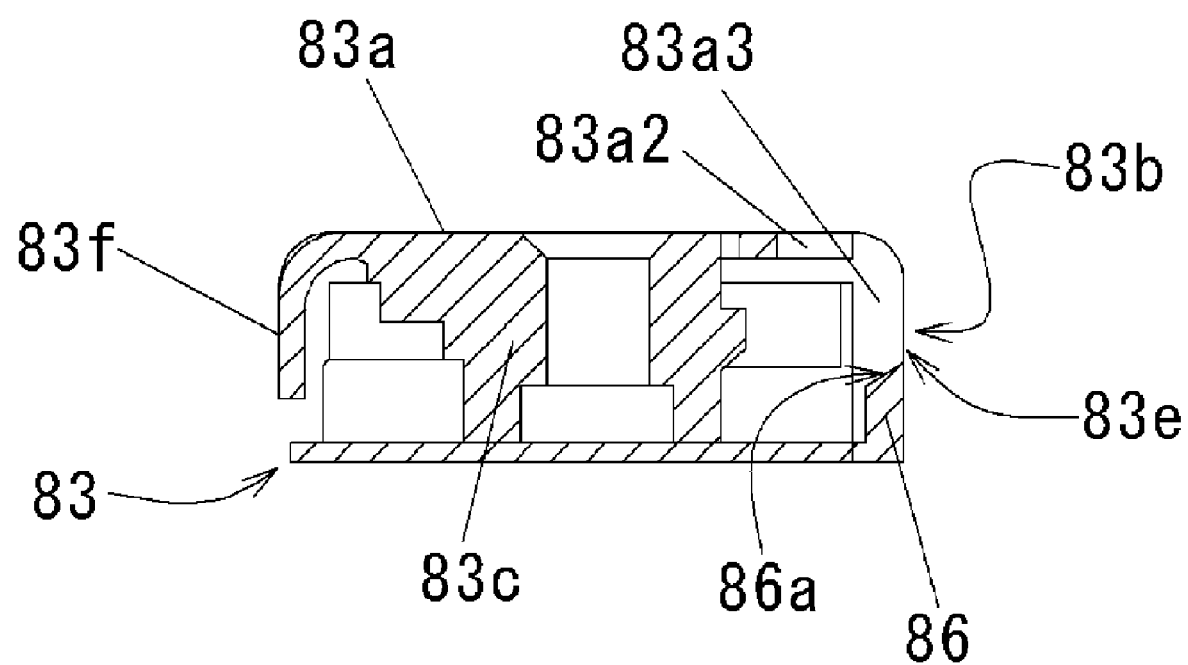
FIG. 4 is a sectional view of the centering case taken along the line X-X in FIG. 3.

The recording disk holder 81 will be explained with reference to FIGS. 2 to 4. FIG. 4 is a sectional view taken along the arrows X-X in FIG. 3.

Referring to FIG. 3, the centering case 83 is provided with the holes 83e. Each hole 83e includes an upper hole 83a2 formed in the bottom surface 83a of the centering case 83, and side holes 83a3 which are continuous with the upper hole 83a2 and which are formed in the bottom surface 83a and the cylindrical portion 83b of the centering case 83. The length of the side hole 83a3 in the circumferential direction is longer than that of the upper hole 83a2 in the circumferential direction. Referring to FIG. 4, the side hole 83a3 is formed with a projection 86 extending toward the upper side in the axial direction of rotation. The projection 86 has substantially the same radial thickness as that of the cylindrical portion 83b of the centering case 83. The projection 86 is formed with a guide surface 86a which is inclined downward toward radially inner side of rotation, and which smoothens the chucking motion of the chuck pawl 84.

Referring to FIG. 2, the resilient member 85 such as a coil spring is accommodated in each of the holes 83e. The resilient member 85 can move forward and backward in the radial direction of rotation. The resilient member 85 is provided at an outer side in the radial direction of rotation. The chuck pawl 84 having a portion projecting more outer side than the cylindrical portion 83b of the centering case 83. The chuck pawl 84 is engaged with the resilient member 85, and the chuck pawl 84 is biased radially outward.

Embodiment of Chuck Pawls

Figure 5A:
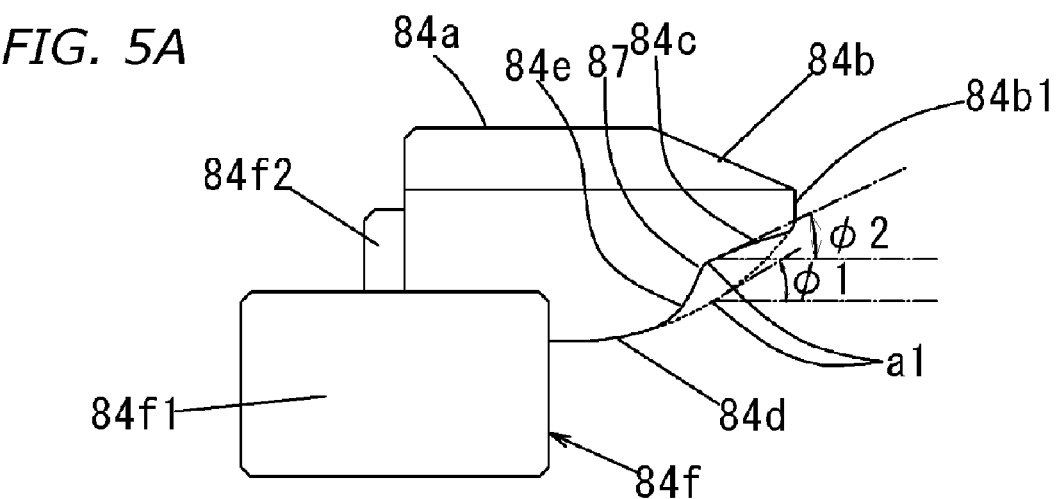
FIGS. 5A and 5B are side views of a chuck pawls of the chucking apparatus of the invention.
Figure 5B:
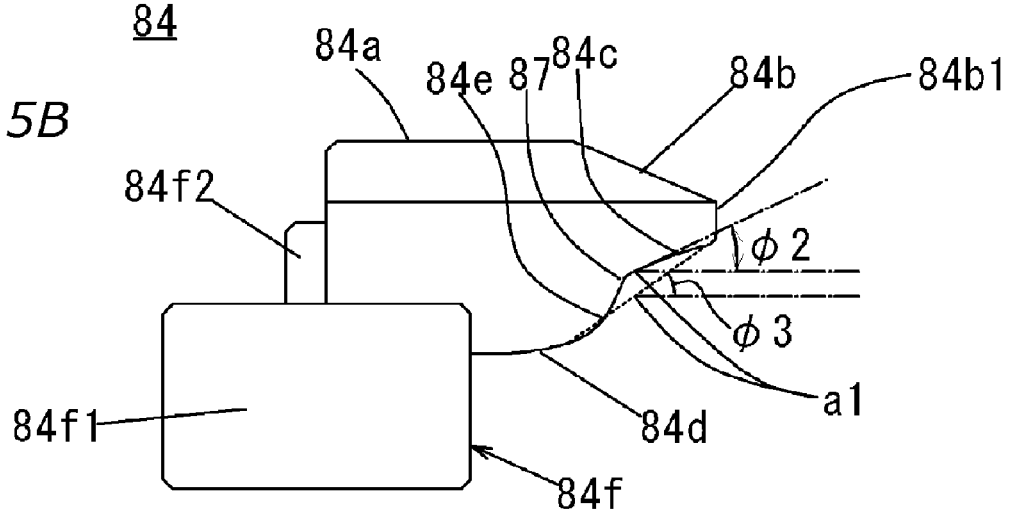
Figure 6:
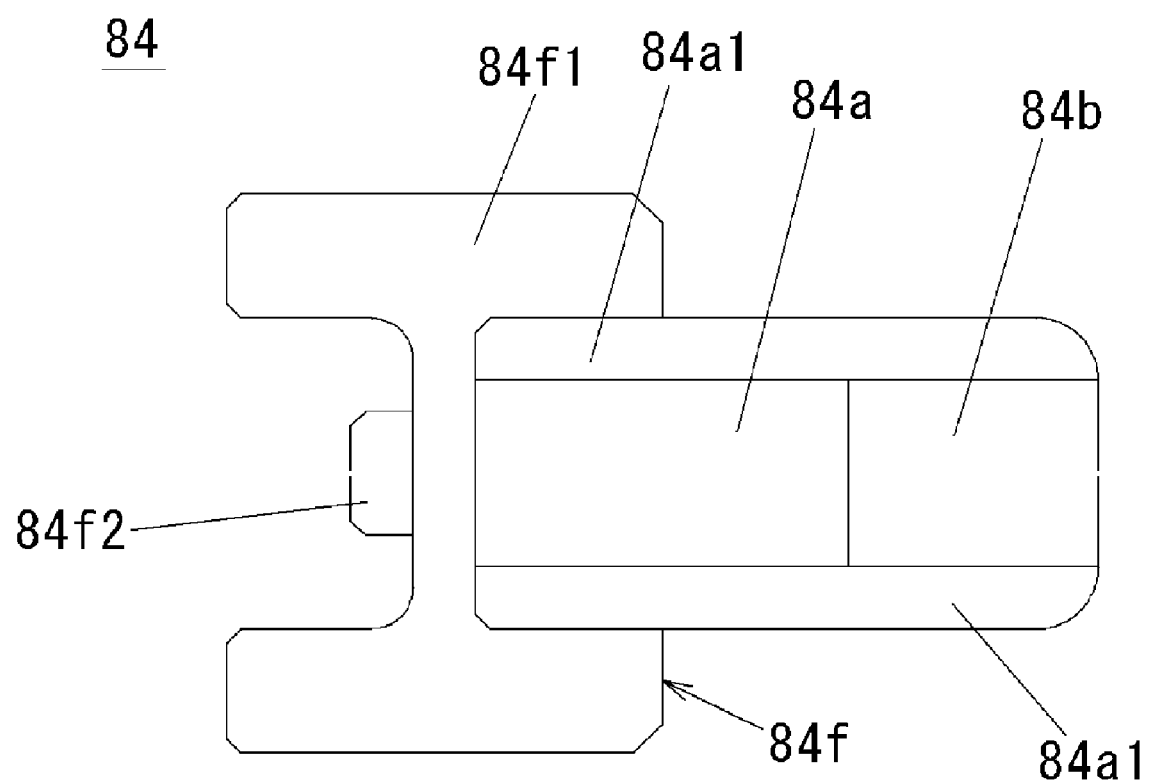
FIG. 6 is a plan view of FIG. 5.

An embodiment of the chuck pawls 84 will be explained with reference to FIGS. 5A, 5B and 6. FIGS. 5A and 5B are side views of the chuck pawl 84, and FIG. 6 is a plan view of the chuck pawl 84.

A flat surface 84a and a first inclined surface 84b are formed on the upper surface of the chuck pawl 84. The first inclined surface 84b is inclined from the flat surface 84a downward radially outward (rightward in FIG. 5).

A second inclined surface 84c is formed on an outermost diameter portion 84b1 of a tip end which is a surface intersecting with the first inclined surface 84b at the outermost side in the radial direction. The second inclined surface 84c is inclined in a curved shape radially inward (leftward in FIG. 5). A third inclined surface 84d which is a curved surface inclining in a curved shape radially outward is formed on a lower portion of the second inclined surface 84c. An auxiliary inclined surface 84e is formed on a boundary portion connecting the second inclined surface 84c and the third inclined surface 84d.

A rectangular projection 84f is connected to a side surface of the chuck pawl 84 such as to cover radially inner sides of the second inclined surface 84c and the third inclined surface 84d. The rectangular projection 84f includes a side surface 84f1 extending from both ends of the rectangular projection 84f in the circumferential direction such as to intersect with an inner direction in the radial direction at right angles, and a projection 84f2 projecting radially inward from the rectangular projection 84f.

A stepped recess 87 is formed on a boundary between the second inclined surface 84c, a portion of the third inclined surface 84d and the auxiliary inclined surface 84e. Since the second inclined surface 84c is formed on the stepped recess 87, the second inclined surface 84c can be inclined closer to the radial direction. As a result, the detaching force of the recording disk 100 can be enhanced.

An angle φ2 formed between the second inclined surface 84c and an upper surface of the recording disk is set smaller than an angle φ1 formed between an upper surface (phantom line) of the recording disk and the phantom curved surface in the recording disk abutment portion a1 with respect to the phantom curved surface which is a curved surface connecting the third inclined surface 84d and the outermost diameter portion 84b1 shown with the phantom line shown in FIG. 5A.

The angle φ2 formed between the second inclined surface 84c and the upper surface of the recording disk is set smaller than an angle φ3 formed between the outermost diameter portion 84d1 of the third inclined surface 84d and the outermost diameter portion 84b1 of the tip end as shown with phantom line in FIG. 5B.

Widths of the flat surface 84a and the first inclined surface 84b in the circumferential direction are narrower than that of the second inclined surface 84c. Center axes of the flat surface 84a, the first inclined surface 84b and the second inclined surface 84c in the circumferential direction match with each other. Thus, the flat surface 84a and the first inclined surface 84b project from an upper surface 84a1 (see FIG. 6) other than the flat surface 84a and the first inclined surface 84b. A width in the circumferential direction formed by the flat surface 84a and the first inclined surface 84b is slightly smaller than a width of the upper hole 83a2 of the centering case 83 in the circumferential direction. The thickness of the flat surface 84a in the axial direction of rotation is substantially equal to the thickness of the bottom surface 83b of the centering case 83 in the axial direction of rotation.

Next, a holding function of the chuck pawls 84 when the chuck pawls 84 are accommodated in the centering case 83 will be explained with reference to FIG. 7.

Figure 7:
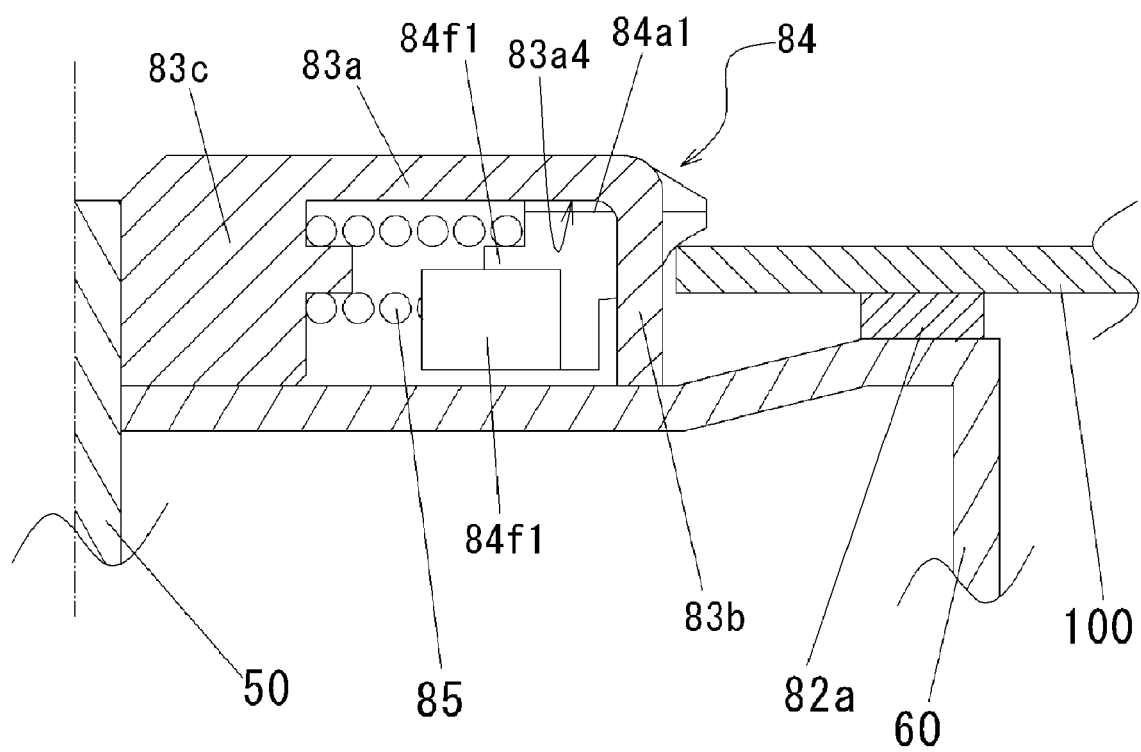
FIG. 7 is a schematic sectional view showing a relation between the centering case and the chuck pawls.

In FIG. 7, a portion of the chuck pawls 84 is accommodated in the hole 83e, and is biased in the radial direction and disposed by the resilient member 85 which is a coil spring or the like. One end of the resilient member 85 is fixed to the inner cylindrical portion 83c of the centering case 83, and the other end is fixed to the projection 84f2 of the chuck pawl 84. Thus, the chuck pawl 84 can move radially inward from the state shown in FIG. 7. The side surface 84/1 of the chuck pawl 84 abuts against the inner peripheral surface of the cylindrical portion 83b of the centering case 83 so that the radially outward movement of the chuck pawl 84 is limited.

In a state in which the chuck pawl 84 is biased radially outward, the first inclined surface 84b and the second inclined surface 84c project radially outward from the hole 83e. With this, when the recording disk 100 is placed on the centering case 83, it is possible to limit the movement of the recording disk 100 in the axial direction.

The chuck pawls 84 maintain a state in which the flat surface 84a and the first inclined surface 84b of the chuck pawl 84 are disposed in the upper hole 83a2 of the centering case 83, and move in the radial direction of rotation. When the chuck pawls 84 move, the upper surface 84a1 comes into slide contact with a lower surface 83a43 of the bottom surface 83a of the hole 83e in the axial direction and moves.

Motion of Chucking Apparatus

Motion of the chucking apparatus 80, especially motion of the disk centering mechanism 83e and motion of the disk holder 81 will be explained with reference to FIG. 1.

When the recording disk 100 is placed on the chucking apparatus 80, the centering case 83 enters into the central through hole 101 of the recording disk 100 relatively.

A radially outer end of the flat surface 84a of the chuck pawl 84 is located at inner side from the cylindrical portion 83b of the centering case 83 in the radial direction. With this, when the recording disk 100 is placed, the inner peripheral edge of the lower portion of the central through hole 101 of the recording disk 100 abuts against the first inclined surface 84b. Further, if the inner peripheral edge of the lower portion of the central through hole 101 of the recording disk 100 pushes the first inclined surface 84b of the chuck pawl 84, the chuck pawl 84 is moved radially inward of rotation. With this, the inner peripheral edge of the lower portion of the central through hole 101 of the recording disk 100 is pushed downward while it is in slide contact with the first inclined surface 84b of the chuck pawl 84.

If the central through hole 101 of the recording disk 100 is pushed down along the first inclined surface 84b and the central through hole 101 of the recording disk 100 rides over the pawl apex of the chuck pawl 84 at which the first inclined surface 84b and the second inclined surface 84c intersect with each other, the chuck pawl 84 moves radially inward of rotation in such a manner that the second inclined surface 84c comes into slide contact with the inner peripheral edge of the upper portion of the central through hole 101 of the recording disk 100. With this, the recording disk 100 receives support from the chuck pawl 84 downward in the axial direction in the inner peripheral edge of the upper portion of the central through hole 101. Together with this, the recording disk 100 receives support axially upward from the recording disk mounting surface 82 in a peripheral surface of the central through hole 101.

The recording disk 100 is held by the chucking apparatus 80 in the above-described manner. The recording disk 100 is held and at the same time, the recording disk 100 is centered as will be described below.

If the recording disk 100 rides over the pawl apex of the chuck pawl 84 and is pushed down, at a position in the axial direction where the radius of the centering pawl 83e on the outer side in the radial direction becomes equal to the radius of the central through hole 101 of the recording disk 100, the centering pawl 83e and the inner peripheral edge of the lower portion of the central through hole 101 of the recording disk 100 come into contact with each other. The radius of the three centering pawls 83e are equal to each other at arbitrary axial positions. Thus, the three centering pawls 83e can equally support the central through hole 101 of the recording disk 100 radially outward, and can center the recording disk 100 and the chucking apparatus 80.

Detaching Force of Recording Disk

Figure 8:
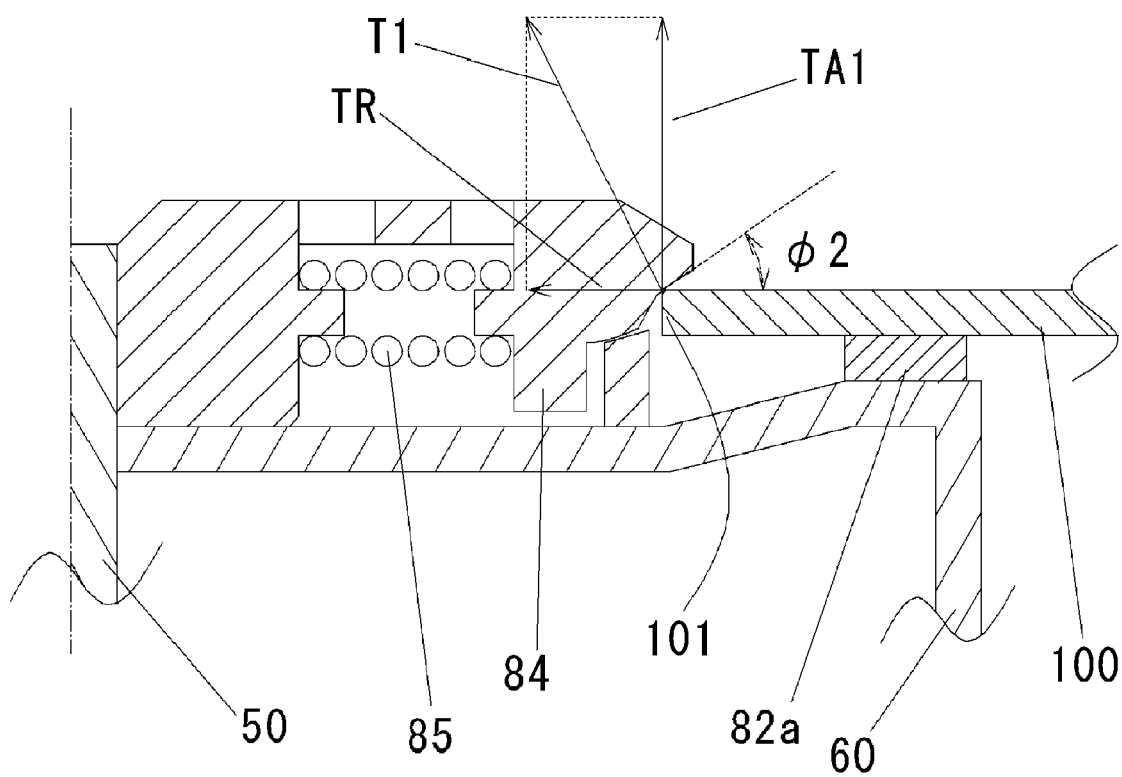
FIG. 8 is a schematic sectional view showing a relation of force between the chucking apparatus and a recording disk.
Figure 9:
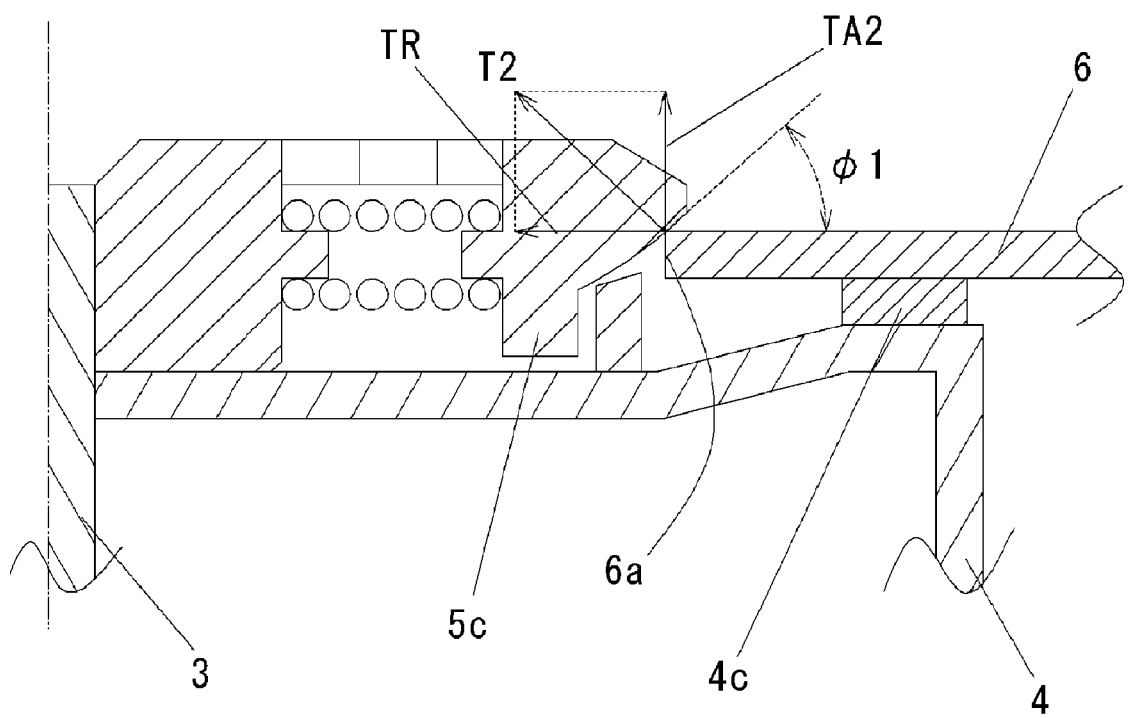
FIG. 9 is a schematic sectional view showing a relation of force of a conventional chucking apparatus and the recording disk.
Figure 10:
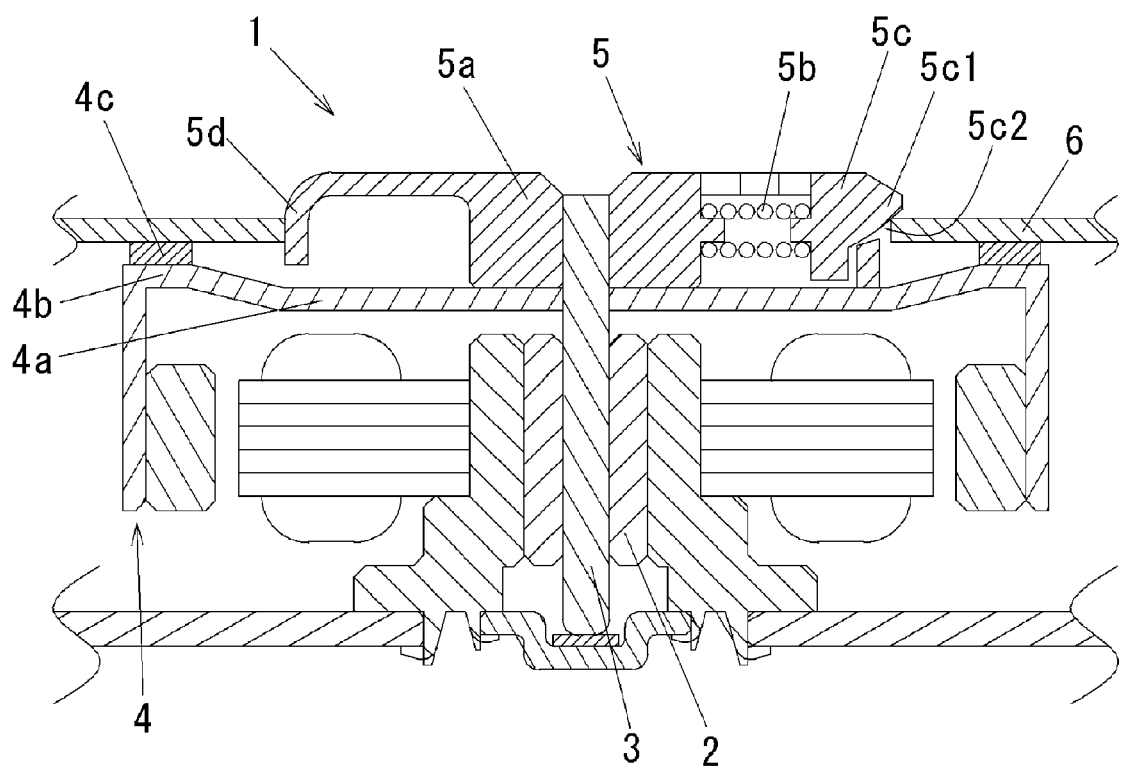
FIG. 10 is a schematic sectional view showing a conventional recording disk drive motor.

A detaching force when removing the recording disk 100 will be explained in comparison with a conventional example with reference to FIGS. 8 and 9. FIG. 8 is a sectional view of the chucking apparatus 80 of the embodiment of the invention in the axial direction, and shows a relation of force between the chuck pawl 84 and the recording disk 100. FIG. 9 is a sectional view of the chucking apparatus 5 of the conventional example in the axial direction, and shows a relation of force between the chuck pawl 5c and the recording disk 6. Phantom lines in FIGS. 8 and 9 show the rotation shaft.

In FIG. 8, a force applied to the recording disk 100 axially upward to detach the recording disk 100, i.e., a force that the second inclined surface 84c abutting against the recording disk 100 of the chuck pawl 84 is defined as F1. This force is defined as F2 in FIG. 9 showing the conventional example.

To detach the recording disk 100, it is only necessary to apply a constant force for contracting the resilient member 85 radially inward to a position where the recording disk 100 is detached. The constant force is shown with TR in FIGS. 8 and 9. A force applied to the chuck pawl 84 is varied also by an angle formed between the second inclined surface 84c and the recording disk when the chuck pawl 84 and the central through hole 101 of the recording disk 100 abut against each other. In the conventional example shown in FIG. 9, an angle $\phi 4$ (corresponding to the angle $\phi 1$ formed between the phantom curved surface and the upper surface of the recording disk in FIG. 5A formed between the inclined surface 5c2 and the upper surface of the recording disk when the center hole 6a of the recording disk 6 and the chuck pawl 5c abut against each other is great and thus, a force TA2 in the axial direction when a force TR is applied to a position where the recording disk 6 is detached in the radial direction is small. As a result, the resultant of the constant force TF in the radial direction of rotation in which the recording disk 6 is detached and the axial force TA2 becomes small. However, according to the embodiment of the present invention in FIG. 8, since the angle $\phi 2$ formed between the second inclined surface 84c and the upper surface of the recording disk 6 when the central through hole 101 of the recording disk 100 and the chuck pawl 84 abut against each other is small, the axial force TA1 becomes great when the force TR is applied to the position where the recording disk 100 is detached in the radial direction. Thus, The detaching force T1 which is the resultant of the constant force TR in the radial direction of rotation in which the recording disk 100 is detached and the axial force TA1 is great. Since the third inclined surface 84d which is the curved surface similar to that of the conventional example is provided, the chucking motion of the chuck pawl 84 can be guided smoothly in accordance with the attaching and detaching operation of the recording disk 100, the stepped recess 87 is formed, and the second inclined surface 84*c* is inclined in the radial direction. As a result, with the chuck pawl 84 as described above, the angle φ2 formed between the second inclined surface 84*c* and the upper surface of the recording disk when the recording disk 100 and the chuck pawl 84 abut against each other can be reduced, and it is possible to increase the detaching force T1. Since the detaching force T1 is increased, the recording disk 100 does not come out due to the centrifugal force or the impact or the like from outside, and it is possible to provide a chucking apparatus having high reliability and a disk drive motor using the chucking apparatus.

Although the chucking apparatus of the invention and the recording disk drive motor using the chucking apparatus have been explained above, the invention is not limited to the embodiment, and the invention can variously be modified without departing from the scope of the invention.

What is claimed is:

1. A chucking apparatus which coaxially holds a removable recording disk through a central through hole thereof and which is mounted on a rotor to rotates about a rotational axis, the rotor having a shaft, the chucking apparatus comprising:
   a centering case which is located at a rotational symmetrical location around the rotational axis and which has a radially outer peripheral surface on which the recording disc is to be mounted radially facing an inner periphery of the through hole of the recording disk, the centering case having an inner cylindrical portion which the centering case is fixed to an outer surface of the shaft;
   a recording disk mounting surface fixedly located on the rotor member on which the recording disk is placed;
   a plurality of chuck pawls arranged in a radial direction on the centering case, each of chuck pawls located symmetrically about the rotational axis; and
   a resilient member which is disposed radially inward of the chuck pawl and which biases the chuck pawl radially outward, each of the chuck pawls comprising:
   a base which is accommodated in the centering case and which receives a biasing force from the resilient member, and
   a tip end which projects from the radially outer peripheral surface of the centering case radially outward, and which holds the recording disk, wherein the tip end includes:
   a first inclined surface defined as an upper side of the tip end, and contacted by a lower side of a peripheral edge of the through hole of the recording disk when the recording disk is pushed down to be set on the chucking apparatus,
   a second inclined surface defined as an outer part on a lower side of the tip end, and contacted by an upper side of the peripheral edge of the through hole of the recording after the recording disk was pushed down;
   a curved surface defined from an outer portion of the base to an inner potion of the second inclined surface; and
   a boundary defined between the curved surface and the second inclined surface formed in a form of a stepped recess; wherein
   an angle formed between the second inclined surface in the contacting portion with the recording disk and the upper surface of the recording disk is smaller than an angle formed between the upper surface of the recording disk and a phantom curved surface connecting the curved surface and an outermost diameter portion of the tip end.

2. The chucking apparatus according to claim 1, wherein the boundary is formed with an auxiliary inclined surface.

3. The chucking apparatus according to claim 2, wherein a portion or all of the inclined surface is curved.

4. A motor having the chucking apparatus according to claim 3, comprising:
   a drive magnet;
   a rotation member which fixes the chucking apparatus and rotates coaxially with the chucking apparatus;
   a bearing member which rotatably supports the rotation member; and
   a fixing member having an armature for fixing the bearing member.

5. A motor having the chucking apparatus according to claim 2, comprising:
   a drive magnet, a rotation member which fixes the chucking apparatus and rotates coaxially with the chucking apparatus;
   a bearing member which rotatably supports the rotation member; and
   a fixing member having an armature for fixing the bearing member.

6. The chucking apparatus according to claim 1, wherein a portion or all of the inclined surface is curved.

7. A motor having the chucking apparatus according to claim 6, comprising:
   a drive magnet;
   a rotation member which fixes the chucking apparatus and rotates coaxially with the chucking apparatus;
   a bearing member which rotatably supports the rotation member; and
   a fixing member having an armature for fixing the bearing member.

8. The chucking apparatus according to claim 1, wherein an outer periphery of the centering case comprises:
   a hole which corresponds to each of the chuck pawls, and which projects the tip end of the chuck pawl radially outward from the outer periphery of the centering case; and
   a guide portion which is formed on a portion of the peripheral edge of the hole, and which smoothly carries out chucking motion of the tip end of the chuck pawl.

9. A motor having the chucking apparatus according to claim 1, and comprising:
   a drive magnet;
   a rotation member which fixes the chucking apparatus and rotates coaxially with the chucking apparatus;
   a bearing member which rotatably supports the rotation member; and
   a fixing member having an armature for fixing the bearing member.

10. A chucking apparatus which coaxially holds a removal recording disk through a central through hole thereof and which is mounted on a rotor to rotates about a rotational axis, the rotor having a shaft, the chucking apparatus comprising:
    a centering case which is located at a rotational symmetrical location around the rotational axis and which has a radially outer peripheral surface on which the recording disc is to be mounted radially facing an inner periphery of the through hole of the recording disk, the centering case having an inner cylindrical portion which the centering case is fixed to an outer surface of the shaft;
    a recording disk mounting surface fixedly located on the rotor member on which the recording disk is placed;

a plurality of chuck pawls arranged in a radial direction on the centering case, each of chuck pawls located symmetrically about the rotational axis; and a resilient member which is disposed radially inward of the chuck pawl and which biases the chuck pawl radially outward, each of the chuck pawls comprising:

a base which is accommodated in the centering case and which receives a biasing force from the resilient member, and a tip end which projects from the radially outer peripheral surface of the centering case radially outward, and which holds the recording disk, wherein the tip end includes:

a first inclined surface defined as an upper side of the tip end, and contacted by a lower side of a peripheral edge of the through hole of the recording disk when the recording disk is pushed down to be set on the chucking apparatus, a second inclined surface defined as an outer part on a lower side of the tip end, and contacted by an upper side of the peripheral edge of the through hole of the recording after the recording disk was pushed down;

a curved surface defined from an outer portion of the base to an inner potion of the second inclined surface; and a boundary defined between the curved surface and the second inclined surface formed in a form of a stepped recess, wherein an angle formed between the second inclined surface in the contacting portion with the recording disk and the upper surface of the recording disk is smaller than an angle formed between the upper surface of the recording disk and a surface connecting an outermost diameter portion of the curved surface and an outermost diameter portion of the tip end.

11. The chucking apparatus according to claim 10, wherein the boundary is formed with an auxiliary inclined surface.

12. The chucking apparatus according to claim 10, wherein a portion or all of the inclined surface is curved.

13. The chucking apparatus according to claim 10; wherein an outer periphery of the centering case comprises, a hole which corresponds to each of the chuck pawls, and which projects the tip end of the chuck pawl radially outward from the outer periphery of the centering case, and a guide portion which is formed on a portion of the peripheral edge of the hole, and which smoothly carries out chucking motion of the tip end of the chuck pawl.

* * * * *